United States Patent
Lin

(10) Patent No.: US 6,634,909 B2
(45) Date of Patent: Oct. 21, 2003

(54) HARD DISK DRIVE CARTRIDGE WITH DUAL JOINTS FOR 68-PIN AND 80-PIN HARD DISKS

(76) Inventor: Shu-Fen Lin, P.O. Box No. 6-57, Chung Ho, Taipei 235 (TW)

( * ) Notice: Subject to any disclaimer, the term of this patent is extended or adjusted under 35 U.S.C. 154(b) by 0 days.

(21) Appl. No.: 10/050,706

(22) Filed: Jan. 18, 2002

(65) Prior Publication Data

US 2003/0139098 A1 Jul. 24, 2003

(51) Int. Cl.[7] .............................................. H01R 25/00
(52) U.S. Cl. ...................................................... 439/638
(58) Field of Search ................................ 439/638, 635, 439/928.1; 361/685

(56) References Cited

U.S. PATENT DOCUMENTS

| | | | | |
|---|---|---|---|---|
| 5,187,643 A | * | 2/1993 | I-Shou | 361/685 |
| 5,211,459 A | * | 5/1993 | Wu | 211/26 |
| 5,816,861 A | * | 10/1998 | Cheng | 439/653 |
| 6,176,743 B1 | * | 1/2001 | Kuo | 439/638 |
| 6,364,713 B1 | * | 4/2002 | Kuo | 439/638 |

OTHER PUBLICATIONS

IBM (Techinical Disclosure Bulletin) vol. 37 No 048 Apr. 1994.*

* cited by examiner

Primary Examiner—Lynn Feild
Assistant Examiner—Phuong K Dinh
(74) Attorney, Agent, or Firm—Troxell Law Office PLLC

(57) ABSTRACT

A hard disk drive cartridge with dual joints for 68-pin and 80-pin hard disks mainly has a horizontal circuit board with a SCA 80-pin joint disposed on the rear rim thereof as well as a juxtaposed LVD 68-pin receptacle and a power receptacle disposed at the front rim thereof; after the said circuit board is fixedly fastened on the rear rim of the hard disk drive cartridge, the 80-pin joint on the rear rim thereof connects with the original receptacle while the 68-pin receptacle at the front rim is available to be directly inserted by hard disks of different systems; through the present invention, 80-pin and 68-pin hard disks of different regulations can be used in the same hard disk drive cartridge so as to reduce the manufacturing cost and the environmental pollution caused by the discarded hard disk cartridge.

1 Claim, 7 Drawing Sheets

HARD DISK DRIVE CARTRIDGE WITH DUAL JOINTS FOR 68-PIN AND 80-PIN HARD DISKS

BACKGROUND OF THE INVENTION

1. Field of the Invention

The present invention relates to a hard disk cartridge with dual joints for 68-pin and 80-pin hard disks, more especially to a hard disk cartridge capable of being shared in use by different hard disks through the conversion of a circuit board.

2. Description of the Prior Art

Accordingly, the common hard disk drive machine used for a personal computer, as shown in FIG. 1 of a pictorial and schematic drawing of a conventional hard disk machine, usually has a connecting cable (II) of LVD 68-pin disposed on the inner rim at the rear aspect of the hard disk drive cartridge; or as shown in FIG. 2 of a pictorial and schematic drawing of a conventional hard disk drive cartridge disposed with a connector (12) of SCA 80-pin for adapting to different hard disks; no matter what kinds of hard disks are installed, the connecting method is fixed; therefore, the consumers need to purchase different hard disk drive cartridges for using different hard disks and that is not preferred because it not only causes the economic burden, but also occupies the storage space; these kinds of shortcomings has troubled and been criticized by the industrials and the consumers for a long time, therefore, it is necessary to provide a hard disk cartridge with dual joints for 68-pin and 80-pin hard disks with specifically increased efficiency and enhanced practical value and it is also the innovative motive of the present invention.

SUMMARY OF THE INVENTION

Therefore, the primary objective of the present invention is to provide a hard disk cartridge with dual joints for 68-pin and 80-pin hard disks to make a single hard disk drive cartridge adaptable to different hard disks of LVD 68-pin and SCA 80-pin synchronously so as to save the consumer's expense and enhance the practical value of the hard disk drive cartridge.

The abovementioned hard disk drive cartridge is disposed with a horizontal circuit board and a SCA 80-pin joint is disposed on the rear rim thereof as well as a juxtaposed LVD 68-pin receptacle and a power receptacle are disposed at the front rim thereof; the said circuit board is placed on the rear rim of the inner frame of the hard disk drive cartridge, through the engagement between the 80-pin joint on the rear rim thereof and a connector on the outer frame as well as the availability the 68-pin receptacle at the front rim for direct insertions of hard disks with different connecting joints, the same hard disk drive cartridge can be shared in use by 80-pin and 68-pin hard disks.

The said hard disk drive cartridge allows the hard disk to be connected to the receptacle of the circuit board through direct insertion to eliminate the situation of degressive transmission caused by the connection of a serial cable.

To enable a further understanding of the main features and the innovation of the present invention, the brief description of the drawings below is followed by the detailed description of the preferred embodiment.

DETAILED DESCRIPTION OF THE PREFERRED EMBODIMENTS

Figure 1:
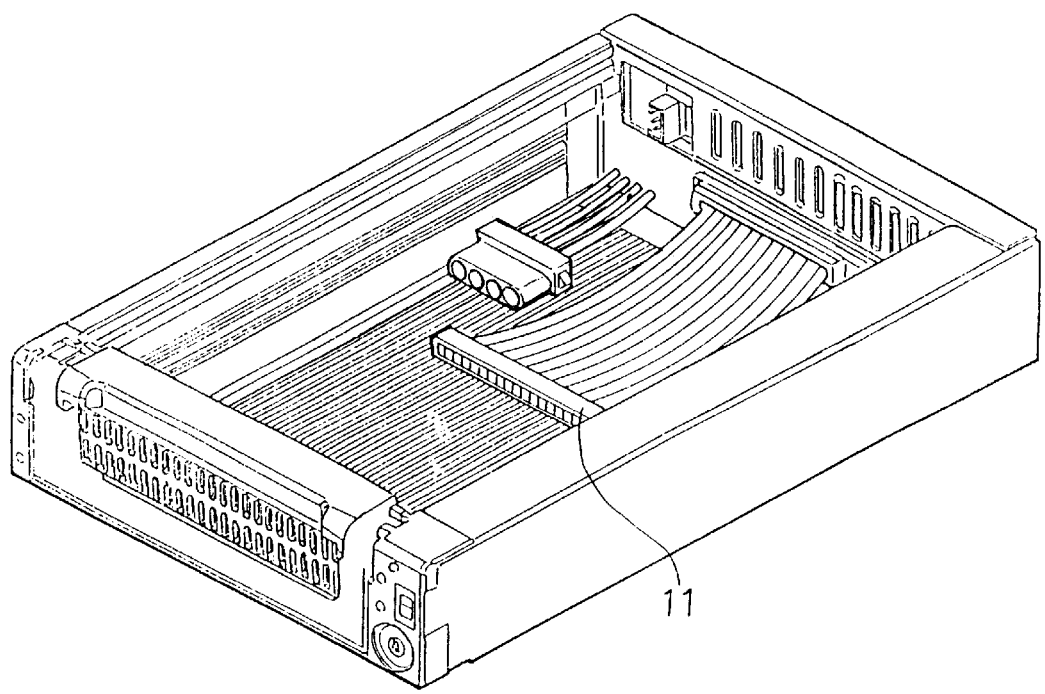
FIG. 1 is a pictorial and schematic drawing of a conventional hard disk drive machine.
Figure 2:
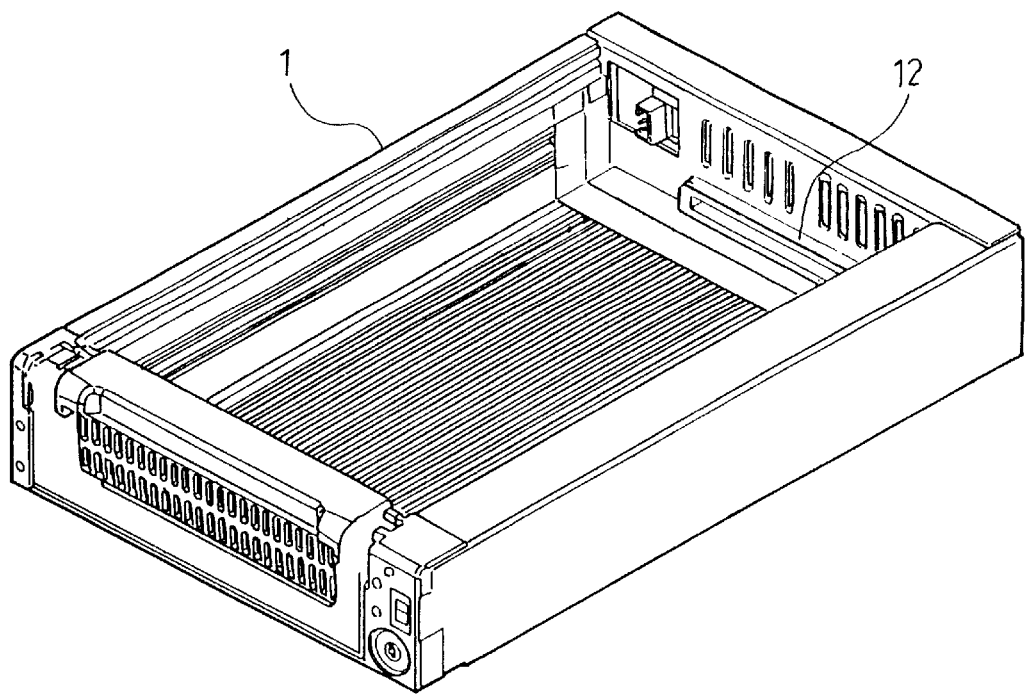
FIG. 2 is a pictorial and schematic drawing of a conventional hard disk drive machine.
Figure 3:
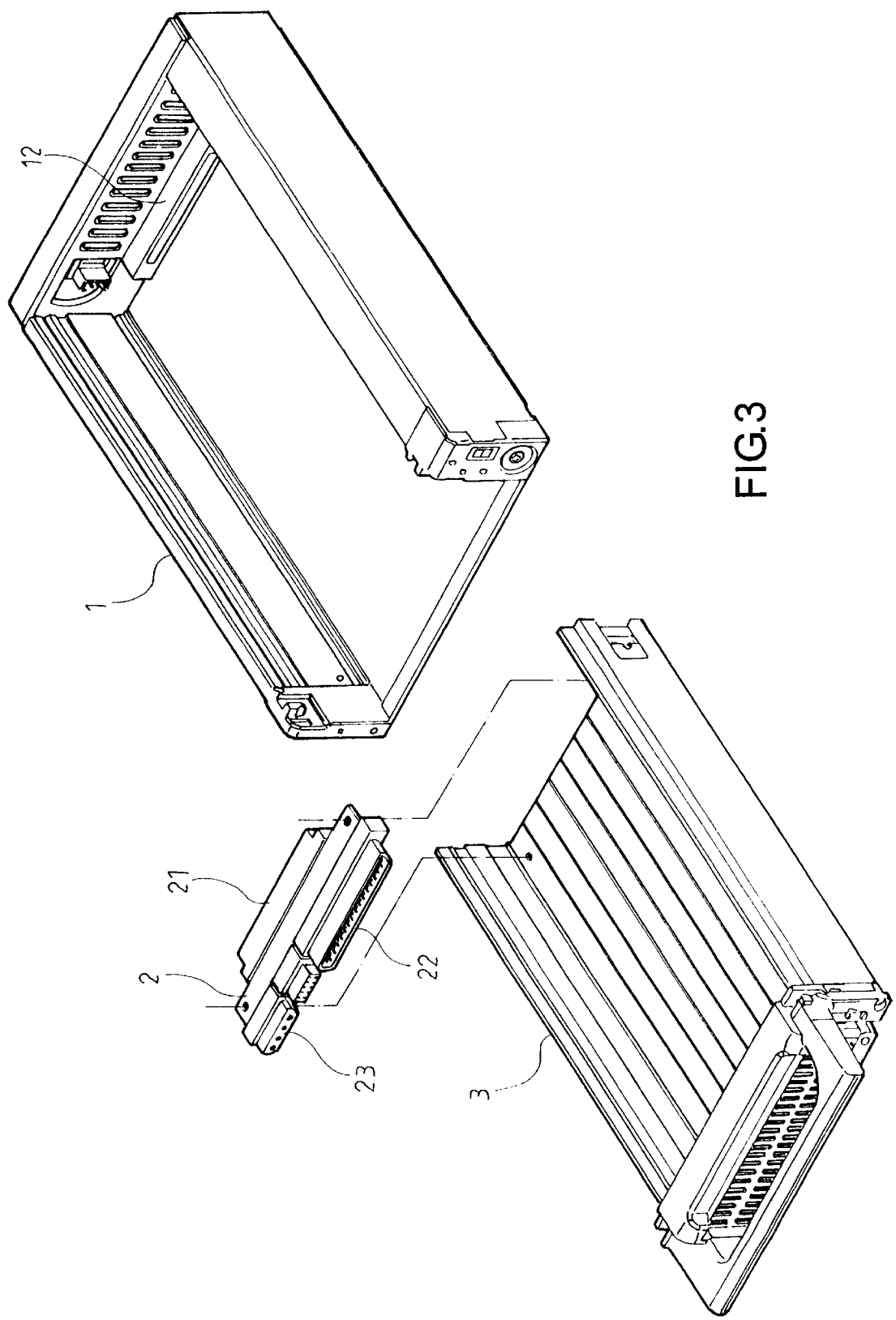
FIG. 3 is a schematic drawing of an exemplary embodiment of the present invention applied to a 68-pin hard disk.
Figure 4:
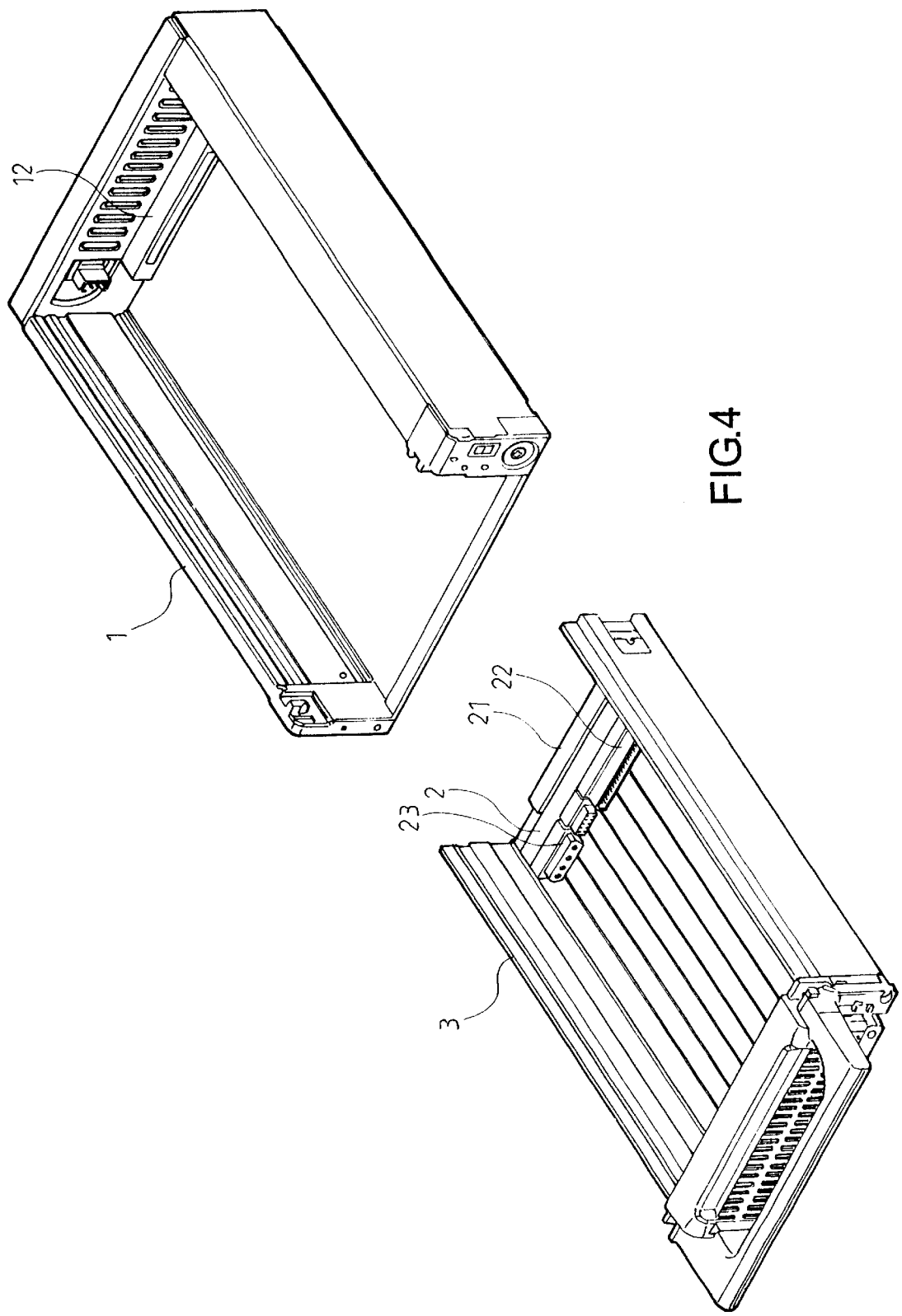
FIG. 4 is a schematic drawing of an exemplary embodiment of the present invention applied to a 68-pin hard disk.

Referring to FIGS. 3 and 4, the schematic drawings of exemplary embodiments of the present invention applied to a 68-pin hard disk, the present invention mainly comprises a horizontal circuit board (2) with a SCA 80-pin connector (21) disposed on the rear rim thereof as well as a LVD 68-pin connector (22) and a power receptacle (23) disposed at the front rim thereof; the said circuit board (2) is fixedly fastened on the rear rim of the inner frame (3) of the widened hard disk drive cartridge, the 80-pin connector (21) on the rear rim thereof is inserted into the original SCA 80-pin connector (12) on an outer frame (1) of the hard disk drive cartridge; the 68-pin connector (22) at the front rim is available to be inserted by 68-pin hard disks; to cooperate with the function of the left and right displacement of the inner frame (3) of the widened hard disk drive cartridge and through the conversion of the circuit board (2), the 68-pin hard disks can be adapted to the outer frame (1) of the original 80-pin hard disk drive cartridge.

Figure 5:
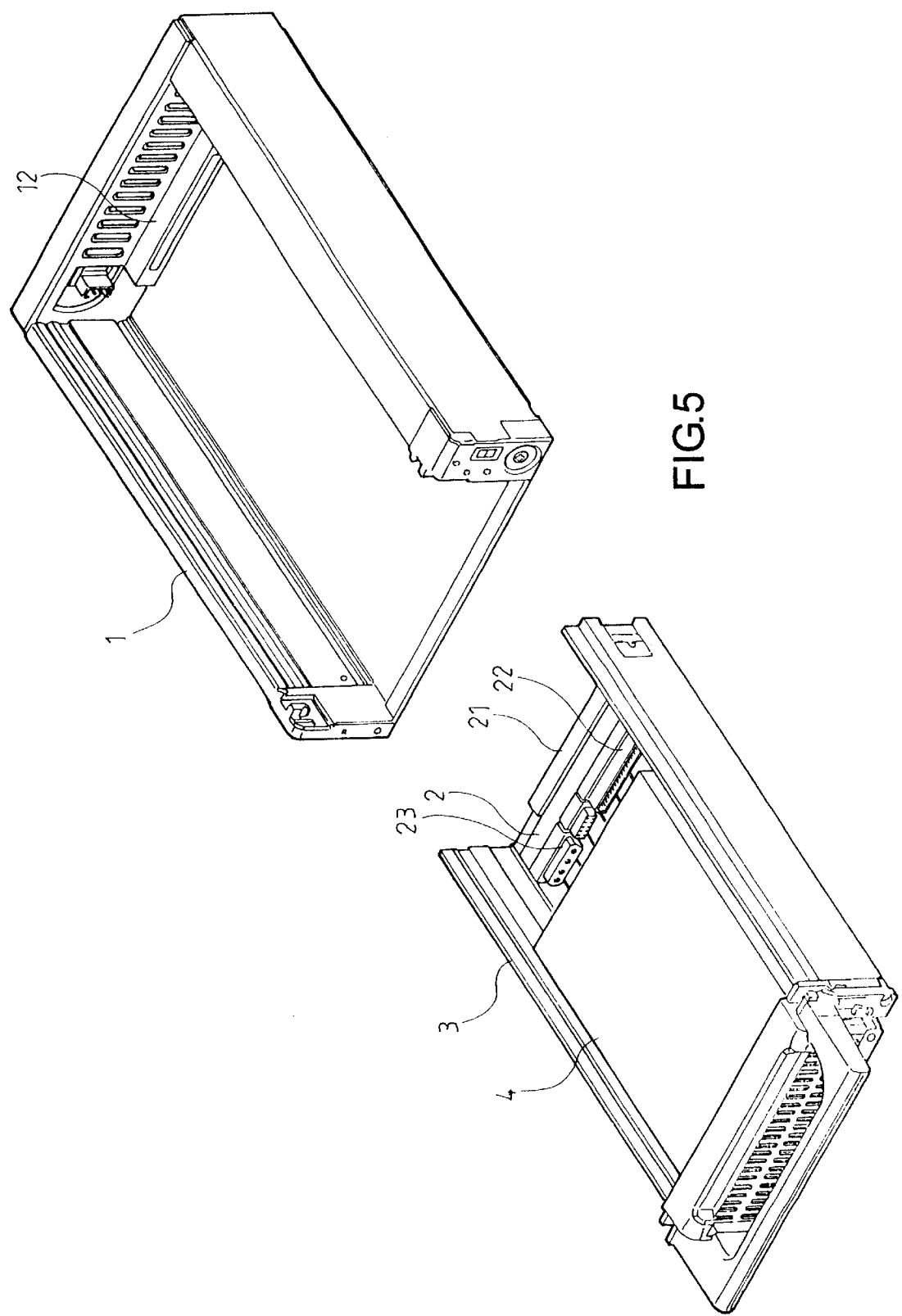
FIG. 5 is a schematic drawing of an exemplary embodiment of assembling a 68-pin hard disk with the present invention.

Referring to FIG. 5, the schematic drawing of an exemplary embodiment of assembling a 68-pin hard disk with the present invention, when being converted for application, the circuit board (2) of the present invention is fixed on the rear rim of the inner frame (3) of the widened hard disk drive cartridge to make a 68-pin hard disk (4) insert into the 68-pin connector (22); then the 80-pin connector (21) on the rear rim thereof is inserted to the 80-pin connector (12) on the outer frame (1) of the hard disk drive cartridge; thereby after conversion, the 68-pin hard disk (4) can be adapted to the original 80-pin hard disk drive machine.

Figure 6:
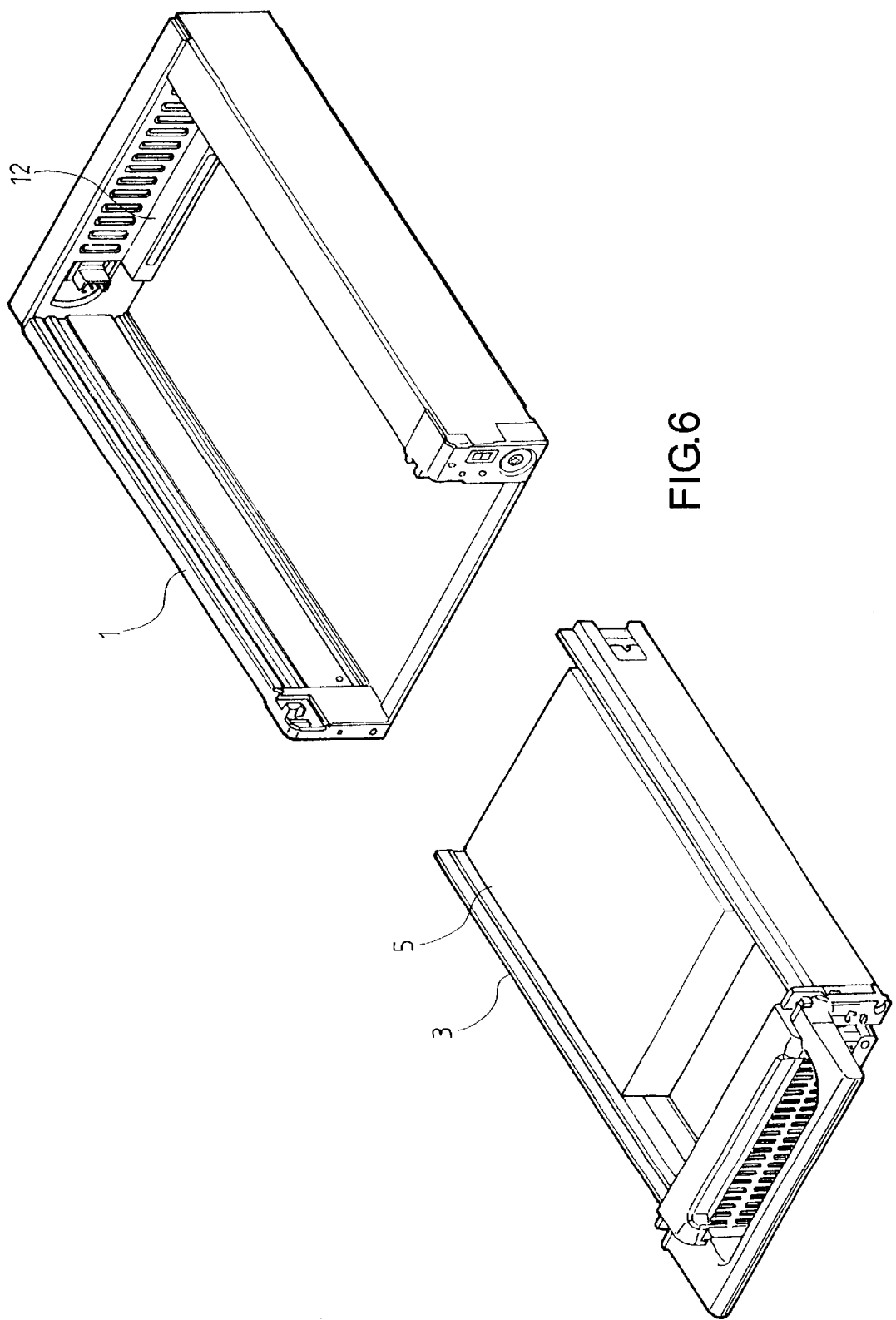
FIG. 6 is a schematic drawing of an exemplary embodiment of the present invention applied to an 80-pin hard disk.
Figure 7:
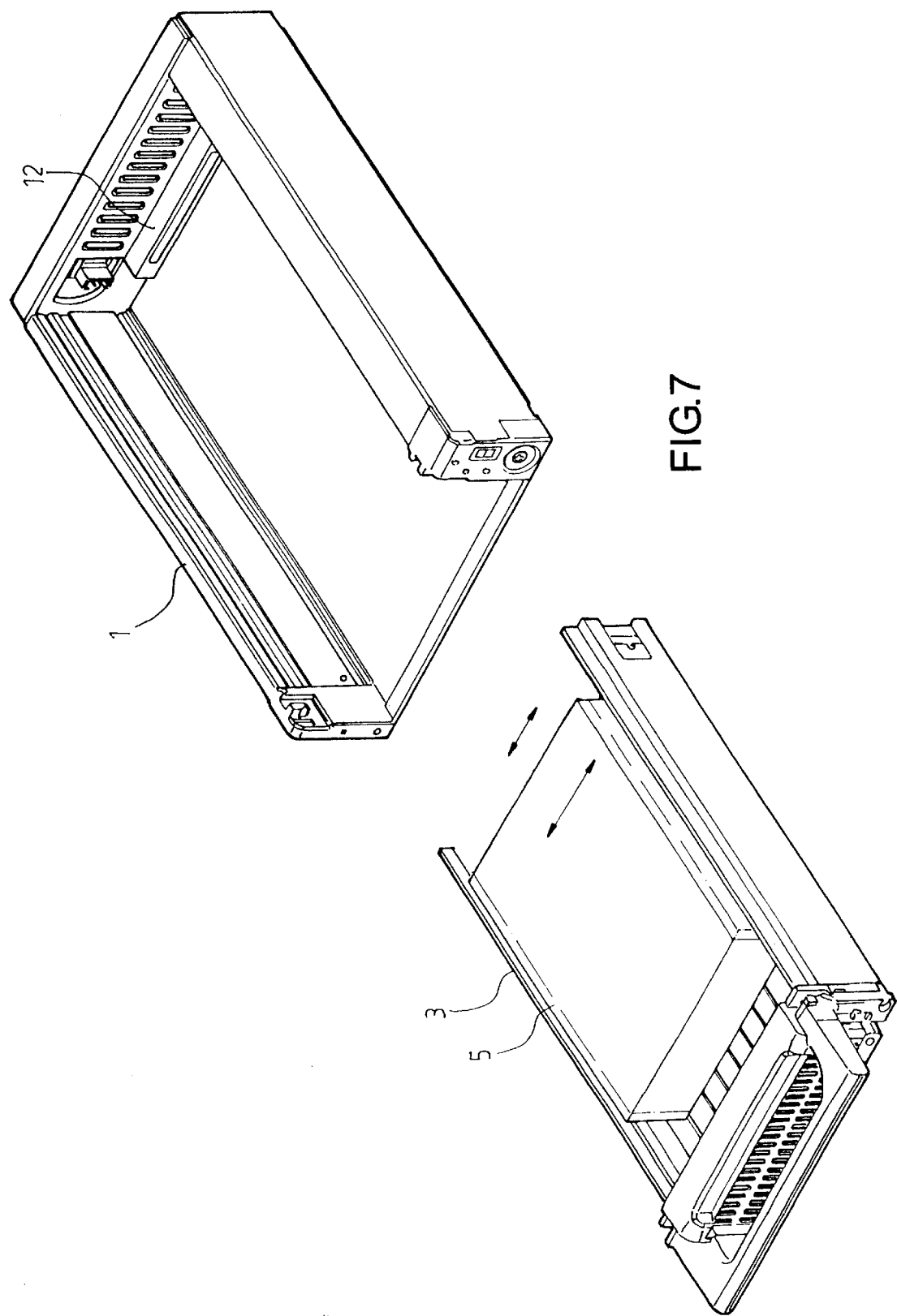
FIG. 7 is a schematic drawing of an exemplary embodiment of the present invention applied to an 80-pin hard disk

Referring to FIGS. 6 and 7, the schematic drawings of exemplary embodiments of the present invention applied to an 80-pin hard disk, when the present invention is applied to an 80-pin hard disk (5), the circuit board (2) is detached to place the 80-pin hard disk (5) on the inner frame (3) of the widened hard disk drive cartridge for directly inserting to the 80-pin connector (12) on the outer frame (1) of the hard disk drive cartridge; the size of the inner frame (3) of the widened hard disk drive cartridge is larger than that of the 80-pin hard disk (5) and that means an adjusting space is preserved (there is no adjusting space preserved on the inner frame of a conventional hard disk drive cartridge) to allow the 80-pin hard disk (5) to be able to displace and adjust left and right for the insertions of hard disks of different brands.

In summation of the abovementioned, the present invention comprising a circuit board disposed with a 68-pin receptacle to be situated on or detached from the inner frame of the widened hard disk drive cartridge composes a hard disk drive cartridge with dual joints for different hard disks; furthermore, since it is not transmitted by any conducting wire when a hard disk is inserted, the situation of degressive transmission caused by a serial cable is eliminated; the present invention is indeed a practical design with innovation.

It is of course to be understood that the embodiment described herein is merely illustrative of the principles of the invention and that a wide variety of modifications thereto may be affected by persons skilled in the art without departing from the spirit and scope of the invention as set forth in the following claims.

What is claimed is:

1. A hard disk drive cartridge assembly comprising:
   a) an outer frame having a rear portion with an SCA 80-pin connector;
   b) an inner frame removably inserted into the outer frame; and,
   c) an adapter removably attached to a rear portion of the inner frame and including a single circuit board having an SCA 80-pin connector on a rear side edge located so as to engage the SCA 80-pin connector on the outer frame, an LVD 68-pin connector on a front side edge of the circuit board, and a power receptacle on the front side edge of the circuit board.

* * * * *